United States Patent
Burg et al.

(10) Patent No.: US 7,643,550 B2
(45) Date of Patent: Jan. 5, 2010

(54) METHOD FOR PRESENTING STREAMING MEDIA FOR AN EVENT

(75) Inventors: Bernard Burg, Menlo Park, CA (US); Craig Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1168 days.

(21) Appl. No.: 10/268,268

(22) Filed: Oct. 9, 2002

(65) Prior Publication Data

US 2004/0071209 A1 Apr. 15, 2004

(51) Int. Cl.
*H04N 7/18* (2006.01)
(52) U.S. Cl. .......................... 375/240.01; 375/240.26; 348/143
(58) Field of Classification Search ......... 348/143–160, 348/231; 375/240.01–240.29; 725/110, 725/116, 118, 146; 709/200, 204, 225; 345/423, 345/589; 386/69; *H04N 7/12*
See application file for complete search history.

(56) References Cited

U.S. PATENT DOCUMENTS

| | | | |
|---|---|---|---|
| 6,421,726 B1 * | 7/2002 | Kenner et al. | 709/225 |
| 2002/0003575 A1 * | 1/2002 | Marchese | 348/231 |
| 2003/0133593 A1 * | 7/2003 | Tullberg et al. | 348/152 |
| 2003/0231179 A1 * | 12/2003 | Suzuki | 345/423 |
| 2004/0045030 A1 * | 3/2004 | Reynolds et al. | 725/110 |
| 2004/0227768 A1 * | 11/2004 | Bates et al. | 345/589 |
| 2005/0141864 A1 * | 6/2005 | Sezan et al. | 386/69 |

\* cited by examiner

*Primary Examiner*—Andy S Rao

(57) ABSTRACT

A method for presenting streaming media for an event. Event-specific information is received, wherein the event-specific information comprises data stream information identifying at least one data stream associated with the event, compression quality information identifying a measure of compression quality for the data stream associated with the event, and sensor information identifying at least one sensor associated with the event. The measure of compression quality for the data stream is determined based on the compression quality information and the sensor.

23 Claims, 6 Drawing Sheets

400

410
Receive event-specific information comprising data stream information identifying at least one data stream associated with an event, compression quality information identifying a measure of compression quality for the data stream associated with the event, and sensor information identifying at least one sensor associated with the event

420
Delay the data stream by a predetermined time

430
Determine the measure of compression quality for the data stream based on the measure of compression quality and the sensor

440
Compress the data stream according to the measure of compression quality

450
Transmit the data stream

510
Receive event-specific information comprising data stream information identifying a plurality of data streams associated with an event, compression quality information identifying a measure of compression quality for the data stream associated with the event, sensor information identifying a first sensor and a second sensor associated with the event, and data stream selection information identifying at least one criteria for selecting a data stream from the plurality of data streams

520
Delay the plurality of data streams by a predetermined time

530
Select a data stream from the plurality of data streams based on the second sensor and the data stream selection information

540
Determine the measure of compression quality for the data stream based on the measure of compression quality and the first sensor

550
Compress the data stream according to the measure of compression quality

560
Transmit the data stream

Figure 5

METHOD FOR PRESENTING STREAMING MEDIA FOR AN EVENT

FIELD OF INVENTION

Various embodiments of the present invention relate to the field of media presentation.

BACKGROUND OF THE INVENTION

Throughout history, live sporting events have provided entertainment to the masses. For thousands of years, the only way for a person to view and experience a live sporting event was to physically attend the event. With the advent of radio and television, it was possible to view the event live without being physically located at the event. As information technology has developed, new ways of presenting coverage of a live sporting event are possible.

In recent years, a new generation of portable electronic devices has been developed for receiving and presenting remote media content. For example, a personal digital assistant (PDA) or a portable computer (e.g., a laptop computer) may be configured to present streaming audio and/or video content. Often, due to their portability, these electronic devices receive the media content over a wireless connection. It has been proposed to provide media coverage of a live sporting event over a wireless connection to an electronic device.

For large scale sporting events, such as the Olympic games or a major league baseball game, it is reasonable to assume that a large number of high-resolution video feeds will be available to remote devices. Unfortunately, there are a number of problems associated with transmitting video to remote devices. For one, the bandwidth available to transmit video by a wireless connection to remote devices is limited. When a large number of users are receiving video content wirelessly, there may not be enough bandwidth to provide a full or high resolution image.

Furthermore, power consumption of an electronic device presenting streaming media is greater for a high resolution image (e.g., a high bandwidth signal) than for a low resolution image (e.g., a low bandwidth signal). Also, an electronic device having a small screen may not be able to present a full or high resolution image. As such, the extra bandwidth used to provide the high resolution image is wasted.

SUMMARY OF THE INVENTION

A method for presenting streaming media for an event is presented. Event-specific information is received, wherein the event-specific information comprises data stream information identifying at least one data stream associated with the event, compression quality information identifying a measure of compression quality for the data stream associated with the event, and sensor information identifying at least one sensor associated with the event. The measure of compression quality for the data stream is determined based on the compression quality information and the sensor.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flow chart of a process for presenting streaming media in accordance with one embodiment of the present invention.

FIG. 5 is a flow chart of a process for presenting streaming media in accordance with another embodiment of the present invention.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide a method and electronic device for presenting streaming media for an event, for example a sporting event. The present invention provides for intelligently adjusting a measure of compression quality to efficiently use the bandwidth available. By coupling knowledge of a specific event with sensor readings, embodiments of the present invention provide a higher measure of compression quality when something interesting is happening in an event and a lower measure of compression quality when something not as interesting is happening.

Figure 1:
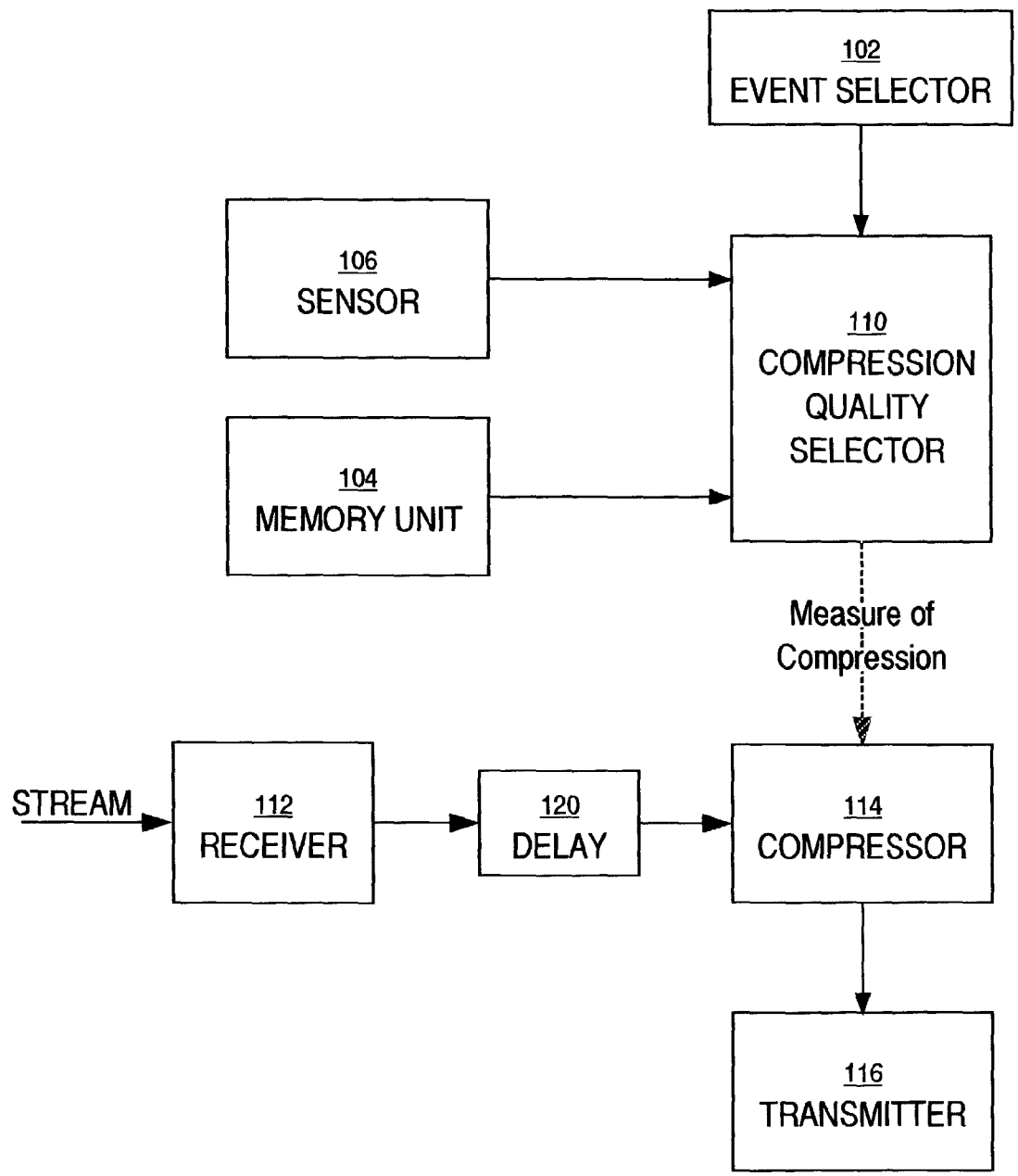
FIG. 1 is a block diagram of an exemplary electronic device for presenting streaming media in accordance with one embodiment of the present invention.

FIG. 1 is a block diagram of an electronic device 100 for presenting streaming media in accordance with one embodiment of the present invention. In one embodiment, electronic device 100 comprises event selector 102, memory unit 104, sensor 106 and compression quality selector 110. Event selector 102 is operable to receive an event selection from a user. In one embodiment, the event selection is made by a user operating a portable computer system communicatively coupled to electronic device 100 over a wireless connection. In response to the event selection, event selector 102 identifies event-specific information for the selected event.

Memory unit 104 has stored therein event-specific information for a plurality of events. It should be appreciated that the event-specific information for a particular event identifies the information required to adjust a measure of compression quality for streaming video. In one embodiment, the event-specific information comprises data stream information, compression quality information, and sensor information. The data stream information identifies at least one data stream associated with the event. In one embodiment, the data stream is a video data stream. For example, where the selected event is a long jump, a data stream transmitting video of the long jump is identified. Furthermore, where the selected event is likely to have multiple cameras capturing the action, such as the 5000 meters, a number of data streams transmitting video captured by the cameras is identified. The compression quality information identifies a measure of compression quality for the data stream associated with the event. The sensor information identifies at least one sensor associated with the event. It should be appreciated that memory unit 104 may comprise computer readable volatile memory (e.g., random access memory, static RAM, dynamic, RAM, etc.) for storing information and instructions for a processor and/or a computer readable non-volatile memory (e.g., read only memory, programmable ROM, flash memory, EPROM, EEPROM, etc.) for storing static information and instructions for a processor.

In one embodiment, compression quality selector 110 receives the event selection from selector 102. In response to the event selection, the associated event-specific information is accessed from memory unit 104. It should be appreciated that in one embodiment, compression quality selector 110 comprises a processor. In one embodiment, the processor is operable to perform a process for presenting streaming media for an event (e.g., process 400 of FIG. 4 or process 500 of FIG. 5). As described above, the event-specific information comprises data stream information, compression quality information, and sensor information. In one embodiment, the sensor information identifies a sensor 106 to be used for sensor readings. It should be appreciated that embodiments of the present invention may comprise more than one sensor.

When transmitting a media stream, there is a tradeoff between the fidelity of the stream and the bandwidth needed to transmit it. Since bandwidth is usually a limited resource, it is common to use a lossy compression scheme; deliberately choosing not to transmit all the information in order to save bandwidth. In one embodiment, a lossy compression scheme is to transmit only every second pixel from an image, or only every other frame from a video. More complex compression schemes attempt to remove that portion of the information that is least perceptible to a human.

The compression quality is a measure of the amount of information that is discarded as the media stream is compressed. When the compression quality is very high, little information is lost and the transmitted stream is perceived by humans to be identical to an uncompressed stream. When compression quality is very low, so much information is discarded that the resulting stream is noticeably inferior to the original. For example, it may be blurry, or jerky, or have visible artifacts. Persons familiar with the state of the art in compression technology will be aware of a number of algorithms for varying the amount of data in response to a desired quality setting.

Figure 2A:
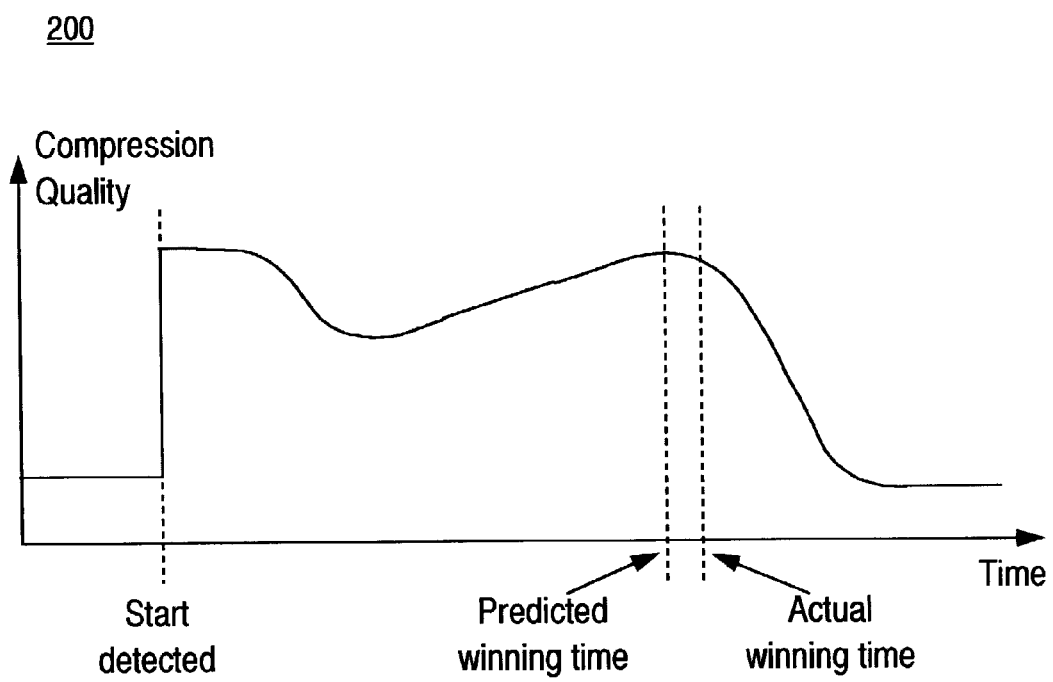
FIGS. 2A and 2B are graphical diagrams of exemplary compression quality information in accordance with one embodiment of the present invention.
Figure 2B:
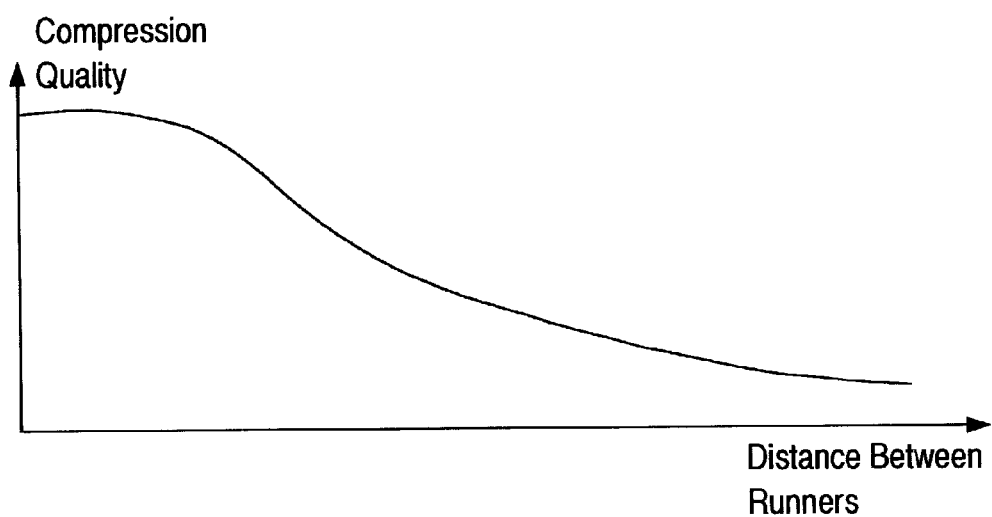

Compression quality selector 110 determines a measure of compression quality based on the sensor reading and the compression quality information. FIGS. 2A and 2B are graphical diagrams of exemplary compression quality information in accordance with one embodiment of the present invention. Compression quality information 200 of FIG. 2A illustrates an example where the measure of compression quality is adjusted according to the time of the event. Because the characteristics of an event are generally known, in certain situations, it is possible to ascertain the important moments in time for an event. For example, consider a race such as the 1500 meters race. Since the 1500 meters is a common event, it is well known among race officials what the approximate finish time for the winner will be, usually within a few seconds.

Generally, the most important or exciting times for a spectator are at the start of the race and at the approach to the finish line. The middle portion of the race may not be considered as important or exciting. Compression quality information 200 illustrates such an example. Prior to the start of the race, nothing is happening, so the measure of compression quality is low. A sensor (e.g., sensor 106 of FIG. 1) is used to detect the start of the race. For example, the sensor may detect the starting gun or may be coupled to the official race timekeeper. When the start is detected, the measure of compression quality increases to produce a high quality video stream. As the race continues, the measure of compression quality tapers down towards the middle of the race, and then picks up as the predicted winning time nears. Because the characteristics of events that base winning on a measure of time are known, the predicted winning time will probably be very close to the actual winning time. Thus, the measure of compression quality at any time can be determined.

There are many other ways to implicitly determine an important or exciting moment in a live event. For example, in a long distance running race, there may be exciting moments apart from just the beginning and end of the race. A spectator may find it exciting when one runner is trying to pass another runner, or a number of runners are clumped together. Compression quality information 250 of FIG. 2B illustrates an example where the measure of compression quality is adjusted according to the distance between competing runners. A sensor (e.g., sensor 106 of FIG. 1) is used to detect the runners. For example, the runners may have electronic ID tags sewn within the seams of their clothing or in their running shoes. Also, a camera or a group of cameras may be used to detect the runners and the distance between them. It should be appreciated that there are a large number of methods for detecting runners and their respective positions commonly known in the art. Compression quality information 250 provides a higher measure of compression quality when the runners are closer together. The measure of compression quality decreases as the distance between the runners increases.

It should be appreciated that any number and combination of sensors and compression quality information can be used to automate the measure of compression quality. For example, the measure of compression quality can be based on a level of sound detected at the event. Implicitly, as crowd noise increases the excitement increases. Alternatively, the measure of compression quality can be based on a level of sound commentators broadcasting the event. Also, the measure of compression quality can be based on a location of the event where sudden changes are likely to occur. For example, consider an automobile race with a sharp turn or an oil spill that is likely to cause an accident. The measure of compression quality may be controlled by any combination of sensors and compression quality information, and is not limited the embodiments as described in the present invention.

With reference to FIG. 1, receiver 112 is operable to receive a data stream of the event. In one embodiment, the data stream is a video stream. In one embodiment, the data stream is delayed by a predetermined time at delay device 120. Due to the varying characteristics of different types of sensors, there may be a lag time between an incident and the detection of the sensor reading at sensor 106. Thus, it is advantageous to delay the media stream prior to compression. For example, consider a running race where crowd noise is sensed. If a runner falls, the crowd reaction will most likely be gasps. By delaying the video stream by a predetermined time, for example a few seconds, there is time to detect the crowd's reaction, and raise the compression quality before the first frames showing the runner falling reach the compressor. It should be appreciated that delay device 120 is optional, and that embodiments of the present invention are directed towards electronic devices with and/or without delay device 120.

The video stream is transmitted to compressor 114. Compressor 114 compresses the video stream according to the measure of compression as determined at compression quality selector 110. The compressed video stream is then transmitted to transmitter 116. In one embodiment, transmitter 116 transmits the video stream to a portable electronic device by a wireless connection.

Figure 3:
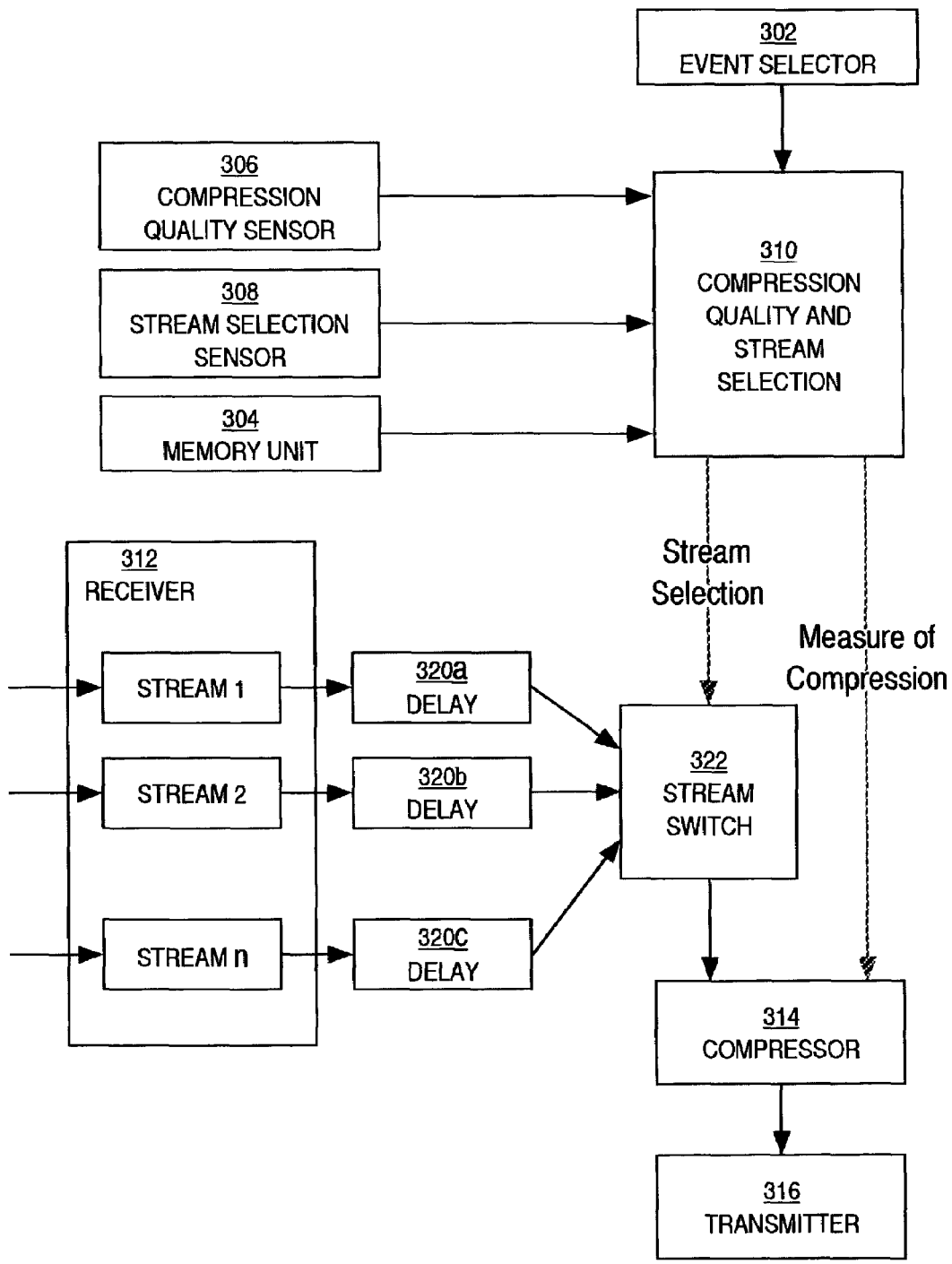
FIG. 3 is a block diagram of an exemplary electronic device for presenting streaming media in accordance with another embodiment of the present invention.

Embodiments of the present invention provide a device and method for automatically selecting a video stream from a plurality of video streams and adjusting the measure of compression quality of the selected stream. The selected stream may then be transmitted to electronic devices for viewing. FIG. 3 is a block diagram of an exemplary electronic device 300 for selecting and presenting streaming media in accordance with one embodiment of the present invention.

In one embodiment, electronic device 300 comprises event selector 302, memory unit 304, first sensor 306, second sensor 308 and compression quality and stream selector 310. Event selector 302 is operable to receive an event selection from a user, and operates similar to event selector 102 of FIG. 1. In one embodiment, the event selection is made by a user operating a portable computer system communicatively coupled to electronic device 300 over a wireless connection. In response to the event selection, event selector 302 identifies event-specific information for the selected event.

Memory unit 304 has stored therein event-specific information for a plurality of events, and operates similar to memory unit 104 of FIG. 1. It should be appreciated that, in accordance with the present embodiment, the event-specific information for a particular event identifies the information required to select the appropriate video stream from a plurality of video streams, and to adjust a measure of compression quality for the selected video stream.

In one embodiment, the event-specific information comprises data stream information, data stream selection information, compression quality information, and sensor information. In the present embodiment, multiple data streams are received, such that the data stream information identifies a plurality of data streams associated with the event. The data stream selection information identifies at least one criterion for selecting a data stream from a plurality of data streams. The compression quality information identifies a measure of compression quality for the data stream associated with the event, as described above. The sensor information identifies at least one stream selection sensor associated with the event for selecting a data stream from the plurality of data streams and at least one compression quality sensor associated with the event for adjusting the measure of compression quality for the selected data stream. It should be appreciated that memory unit 304 may comprise computer readable volatile memory (e.g., random access memory, static RAM, dynamic, RAM, etc.) for storing information and instructions for a processor and/or a computer readable non-volatile memory (e.g., read only memory, programmable ROM, flash memory, EPROM, EEPROM, etc.) for storing static information and instructions for a processor.

In one embodiment, compression quality and stream selector 310 receives the event selection from selector 302. In response to the event selection, the associated event-specific information is accessed from memory unit 304. It should be appreciated that in one embodiment, compression quality and stream selector 310 comprises a processor. In one embodiment, the processor is operable to perform a process for presenting streaming media for an event (e.g., process 500 of FIG. 5). As described above, the event-specific information comprises data stream information, data stream selection information, compression quality information, and sensor information. In one embodiment, the sensor information identifies compression quality sensor 306 and stream selection sensor 308 to be used for sensor readings. It should be appreciated that embodiments of the present invention may comprise more than one compression quality sensor and/or more than one stream selection sensor.

In order to provide the appropriate stream for transmission, embodiments of the present invention provide for automatically selecting the appropriate stream. In accordance with embodiments of the present invention, compression quality and stream selector 310 selects one data stream for presentation based on the stream selection sensor reading and the data stream selection information. In one embodiment, the data stream selection information identifies at least one criterion for evaluating each data stream. The criterion is obtained by receiving data from stream selection sensor 308. In one embodiment, a fragment (e.g., an individual frame) of each data stream is scored. The score is based on the criterion.

It should be appreciated that the criterion used for evaluating each data stream can be selected by a user operating a portable electronic device. In one embodiment, a user receiving transmission of a video stream may select their desired criterion an input the selection such that it is received at event selector 302. For example, a user receiving a transmission of a race may desire to watch a particular runner. Stream selection sensor 308 (e.g., a camera or an electronic ID tag) detects the selected runner. Each stream is given a score based on the inclusion of the desired runner and other factors, such as image clarity. The stream with the highest score is selected for transmission to the portable electronic device of the user.

In another embodiment, the stream currently visible on a camera for display on a live television broadcast is displayed. For example, if something unexpected were to happen in a race, such as two runners tripping over each other, the live television feed may not react immediately, and would probably switch to the incident after it had happened. By delaying the video streams by a predetermined time (e.g., a few seconds), the selected stream would be switched to the stream showing the incident before it happens. Thus, the selected stream transmitted to a portable electronic device would show the unexpected incident in full, and not merely the aftermath.

It should be appreciated that any number of criteria can be used to score and select a data stream. For example, a stream with the lead runner may receive the highest score. Before the start of the race the starting line may receive the highest score. Near the expected end of the race, the finish line may be shown. Any objective criteria can be used to select a data stream from a plurality of data streams. It should be appreciated that criteria can vary from event to event and user to user. Once a stream is selected, information identifying the selected stream is transmitted to stream switch 322 of electronic device 300.

Receiver 312 is operable to receive a plurality of data streams (e.g., streams 1-n of FIG. 3). In one embodiment, the data streams are video data streams. It should be appreciated that receiver 312 may receive any number of data streams, and is not limited to the present embodiment as illustrated in FIG. 3. In one embodiment, each data stream is delayed by a predetermined time at delay device 320. It should be appreciated that there can be any number of delay devices 320 (e.g., delay device 320a-c of FIG. 3), and is not limited to the present embodiment. Furthermore, one delay device may delay any number of data streams, and is not limited to delaying only one data stream. As such, embodiments of the present invention may comprise any number of delay devices.

The delayed data streams are received at stream switch 322. Stream switch 322 is operable to select one data stream of the plurality of data streams based on the stream selection as determined at compression quality and stream selector 310. Based on information identifying the selected stream, in one embodiment, the selected stream is forwarded to compressor 314 for compression.

Compression quality and stream selector 310 also determines a measure of compression quality based on the compression quality sensor reading and the compression quality information. It should be appreciated the compression quality and stream selector 310 determines the measure of compression quality in a similar manner as compression quality selector 110 of FIG. 1, as described above. Furthermore, as described above, FIGS. 2A and 2B illustrate exemplary compression quality information in accordance with embodiments of the present invention. Once determined, the measure of compression quality is transmitted to compressor 314 to compress the selected stream. Compressor 314 compresses the video stream according to the measure of compression as determined at compression quality and stream selector 310. The compressed video stream is then transmitted to transmitter 316. In one embodiment, transmitter 316 transmits the video stream to a portable electronic device by a wireless connection.

FIG. 4 is a flow chart of a process 400 for presenting streaming media in accordance with one embodiment of the present invention. In one embodiment, process 400 is carried out by processors and electrical components under the control of computer readable and computer executable instructions. Although specific steps are disclosed in process 400, such steps are exemplary. That is, the embodiments of the present invention are well suited to performing various other steps or variations of the steps recited in FIG. 4. As depicted in FIG. 4, process 400 diagrams the operating process of presenting media on an electronic device, for example, electronic device 100 of FIG. 1.

At step 410 of process 400, event-specific information for an event is received at an electronic device. In one embodiment, the event-specific information is received in response to a user request. The event-specific information is based on an event selection made by a user operating a portable computer system communicatively coupled to an electronic device over a wireless connection. In response to the event selection, event-specific information is identified for the selected event. It should be appreciated that the event-specific information for a particular event identifies the information required to adjust a measure of compression quality for streaming video.

In one embodiment, the event-specific information comprises data stream information, compression quality information, and sensor information, as described above. In one embodiment, the data stream information identifies at least one data stream associated with the event, the compression quality information identifies a measure of compression quality for the data stream associated with the event, and the sensor information identifies at least one sensor (e.g., sensor 106 of FIG. 1) associated with the event. In one embodiment, the data stream is a video data stream. It should be appreciated that the event-specific information may reside within computer readable volatile memory of the electronic device (e.g., memory unit 104 of FIG. 1).

At step 420, the data stream is delayed by a predetermined time. In one embodiment, the data stream is delayed a few seconds (e.g., 1-5 seconds). In one embodiment, the data stream is delayed by a delay device (e.g., delay device 120 of FIG. 1). It should be appreciated that step 420 is optional.

At step 430, the measure of compression quality for the data stream is determined based on the compression quality information and the sensor. In one embodiment, the measure of compression quality defines a video resolution of the data stream. In one embodiment, the measure of compression quality is determined by a compression quality selector of the electronic device (e.g., compression quality selector 110 of FIG. 1).

At step 440, the data stream is compressed according to the measure of compression quality. In one embodiment, the data stream is received at a compressor of the electronic device (e.g., compressor 114 of FIG. 1). The compressor operates to compress the data stream according to the measure of compression as received from the compression quality selector.

At step 450, the compressed data stream is transmitted by a transmitter of the electronic device (e.g., transmitter 116 of FIG. 1). In one embodiment, the data stream is transmitted by a wireless connection to a portable electronic device.

FIG. 5 is a flow chart of a process for presenting streaming media in accordance with another embodiment of the present invention. In one embodiment, process 500 is carried out by processors and electrical components under the control of computer readable and computer executable instructions. Although specific steps are disclosed in process 500, such steps are exemplary. That is, the embodiments of the present invention are well suited to performing various other steps or variations of the steps recited in FIG. 5. As depicted in FIG. 5, process 500 diagrams the operating process of presenting audio media on an electronic device, for example, electronic device 300 of FIG. 3.

At step 510 of process 500, event-specific information for an event is received at an electronic device. In one embodiment, the event-specific information is received in response to a user request. The event-specific information is based on an event selection made by a user operating a portable computer system communicatively coupled to an electronic device over a wireless connection. In response to the event selection, event-specific information is identified for the selected event. It should be appreciated that the event-specific information for a particular event identifies the information required to adjust a measure of compression quality for streaming video.

In one embodiment, the event-specific information comprises data stream information, data stream selection information, compression quality information, and sensor information. In the present embodiment, multiple data streams (e.g., streams 1-n of FIG. 1) are received, such that the data stream information identifies a plurality of data streams associated with the event. The data stream selection information identifies at least one criterion for selecting a data stream from a plurality of data streams. The compression quality information identifies a measure of compression quality for the data stream associated with the event, as described above. The sensor information identifies at least one stream selection sensor (e.g., stream selection sensor 308 of FIG. 3) associated with the event for selecting a data stream from the plurality of data streams and at least one compression quality sensor (e.g., compression quality sensor 306 of FIG. 3) associated with the event for adjusting the measure of compression quality for the selected data stream. It should be appreciated that the event-specific information may reside within computer readable volatile memory of the electronic device (e.g., memory unit 304 of FIG. 3).

At step 520, the plurality of data streams are delayed by a predetermined time. In one embodiment, the streams are delayed a few seconds (e.g., 1-5 seconds). In one embodiment, the streams are delayed by a delay device (e.g., delay device 320 of FIG. 3).

At step 530, a data stream is selected from the plurality of data streams based on the stream selection sensor (e.g., second sensor) and the data stream selection information. In one embodiment, the data stream is selected by a stream selector of the electronic device (e.g., compression quality and stream selector 310 of FIG. 3).

At step 540, the measure of compression quality for the selected data stream is determined based on the compression quality information and the compression quality sensor (e.g., first sensor). In one embodiment, the measure of compression quality defines a video resolution of the data stream. In one embodiment, the measure of compression quality is determined by a compression quality selector of the electronic device (e.g., compression quality and stream selector 310 of FIG. 3).

At step 550, the data stream is compressed according to the measure of compression quality. In one embodiment, the data stream is received at a compressor of the electronic device (e.g., compressor 314 of FIG. 3). The compressor operates to compress the data stream according to the measure of compression as received from the compression quality selector.

At step 540, the compressed data stream is transmitted by a transmitter of the electronic device (e.g., transmitter 316 of FIG. 3). In one embodiment, the data stream is transmitted by a wireless connection to a portable electronic device.

Various embodiments of the present invention, a method for presenting streaming media for an event, are thus described. While the present invention has been described in particular embodiments, it should be appreciated that the present invention should not be construed as limited by such embodiments, but rather construed according to the below claims.

What is claimed is:

1. A method for presenting streaming media for an event, said method comprising:
   receiving event-specific information comprising data stream information identifying at least one data stream associated with said event, compression quality information identifying a measure of compression quality for said data stream associated with said event, and sensor information identifying at least one sensor associated with said event;
   receiving a sensor reading from said sensor, said sensor reading indicating a condition related to said event not provided in said data stream; and
   determining said measure of compression quality for said data stream based on said compression quality information and said sensor reading.

2. The method as recited in claim 1 wherein said data stream is a video data stream.

3. The method as recited in claim 1 further comprising:
   compressing said data stream according to said measure of compression quality; and
   transmitting said data stream.

4. The method as recited in claim 3 wherein said data stream is transmitted by a wireless connection to a portable electronic device.

5. The method as recited in claim 1 wherein said event-specific information is received in response to a user request.

6. The method as recited in claim 1 further comprising delaying said data stream by a predetermined time.

7. The method as recited in claim 1 wherein said data stream information identifies a plurality of data streams associated with said event, said sensor information identifies a second sensor associated with said event, and said event-specific information further comprises data stream selection information identifying at least one criterion for selecting said data stream from said plurality of data streams.

8. The method as recited in claim 7 further comprising:
   delaying said plurality of data streams by a predetermined time; and
   selecting said data stream from said plurality of data streams based on said second sensor and said data stream selection information.

9. An electronic device comprising:
   a receiver configured to receive at least one data stream associated with an event;
   a memory unit having stored therein event-specific information for said event, said event-specific information comprising data stream information identifying at least one said data stream associated with said event, compression quality information identifying a measure of compression quality for said data stream associated with said event, and sensor information identifying at least one sensor associated with said event, wherein a sensor reading of said sensor is operable to indicate conditions related to said event not provided in said data stream;
   a compression quality selector configured to determine said measure of compression quality based on said compression quality information and said sensor reading;
   a compressor for compressing said data stream according to said measure of compression quality; and
   a transmitter for transmitting said data stream.

10. The electronic device as recited in claim 9 wherein said data stream is a video data stream.

11. The electronic device as recited in claim 9 wherein said transmitter is configured to transmit said data stream by a wireless connection to a portable electronic device.

12. The electronic device as recited in claim 9 further comprising an event selector wherein said event is selected in response to a user request.

13. The electronic device as recited in claim 9 further comprising a data stream delay device configured to delay said data stream by a predetermined time.

14. The electronic device as recited in claim 9 wherein said data stream information identifies a plurality of data streams associated with said event, said sensor information identifies a second sensor associated with said event, and said event-specific information further comprises data stream selection information identifying at least one criterion for selecting said data stream from said plurality of data streams.

15. The electronic device as recited in claim 14 further comprising:
   a data stream delay device configured to delay at least one data stream of said plurality of data streams by a predetermined time; and
   a data stream selector configured to select said data stream from said plurality of data streams based on said second sensor and said data stream selection information.

16. A system for presenting streaming media for an event, said system comprising:
   means for receiving event-specific information comprising data stream information identifying at least one data stream associated with said event, compression quality information identifying a measure of compression quality for said data stream associated with said event, and sensor information identifying at least one sensor associated with said event;
   means for receiving a sensor reading from said sensor, said sensor reading indicating a condition related to said event not provided in said data stream; and means for determining said measure of compression quality for said data stream based on said compression quality information and said sensor reading.

17. The system as recited in claim 16 wherein said data stream is a video data stream.

18. The system as recited in claim 16 further comprising:
means for compressing said data stream according to said measure of compression quality; and
means for transmitting said data stream.

19. The system as recited in claim 18 wherein said data stream is transmitted by a wireless connection to a portable electronic device.

20. The system as recited in claim 16 wherein said event-specific information is received in response to a user request.

21. The system as recited in claim 16 further comprising means for delaying said data stream by a predetermined time.

22. The system as recited in claim 16 wherein said data stream information identifies a plurality of data streams associated with said event, said sensor information identifies a second sensor associated with said event, and said event-specific information further comprises data stream selection information identifying at least one criterion for selecting said data stream from said plurality of data streams.

23. The system as recited in claim 22 further comprising:
means for delaying said plurality of data streams by a predetermined time; and
means for selecting said data stream from said plurality of data streams based on said second sensor and said data stream selection information.

* * * * *